United States Patent [19]

Szlaga

[11] Patent Number: 5,028,244
[45] Date of Patent: Jul. 2, 1991

[54] TANK VENTING CONTROL VALVE ASSEMBLY

[75] Inventor: Emil Szlaga, Connersville, Ind.
[73] Assignee: Stant Inc., Connersville, Ind.
[21] Appl. No.: 546,913
[22] Filed: Jun. 27, 1990
[51] Int. Cl.⁵ .............................................. B01D 19/00
[52] U.S. Cl. ...................................... 55/170; 137/202; 141/303; 210/120; 220/85 VR; 220/86.1
[58] Field of Search ................... 55/88, 165, 168–170, 55/199, 201; 141/44, 45, 286, 303; 137/202; 210/120, 188; 220/85 VR, 85 VS, 86.1

[56] References Cited

U.S. PATENT DOCUMENTS

| | | |
|---|---|---|
| 1,683,338 | 9/1928 | Evinrude . |
| 2,396,233 | 3/1946 | Abrams . |
| 2,751,925 | 6/1956 | Axlander . |
| 3,521,652 | 7/1970 | Reeks . |
| 3,916,928 | 11/1975 | Enoch . |
| 3,970,098 | 7/1976 | Boswank et al. . |
| 3,996,951 | 12/1976 | Parr et al. . |
| 4,000,828 | 1/1977 | Crute et al. . |
| 4,095,609 | 6/1978 | Martin . |
| 4,351,350 | 9/1982 | Crute . |
| 4,655,238 | 4/1987 | Szlaga . |
| 4,685,584 | 8/1987 | Harris . |
| 4,694,847 | 9/1987 | Szlaga . |
| 4,735,226 | 4/1988 | Szlaga . |
| 4,760,858 | 8/1988 | Szlaga ........................ 220/85 VR X |
| 4,778,595 | 10/1988 | Sable et al. .................... 210/120 X |

Primary Examiner—Charles Hart
Attorney, Agent, or Firm—Barnes & Thornburg

[57] ABSTRACT

A tank venting control valve assembly is provided to regulate discharge of liquid fuel and fuel vapor from a fuel tank. The assembly closes automatically to prevent discharge of agitated liquid fuel from the tank or block overfilling of the tank. The assembly opens automatically after agitation of liquid fuel in the tank has subsided or refueling has been completed to cause the fuel level in the tank to fall.

33 Claims, 4 Drawing Sheets

TANK VENTING CONTROL VALVE ASSEMBLY

BACKGROUND AND SUMMARY OF THE INVENTION

The present invention relates to tank pressure control systems, and particularly to an apparatus for regulating discharge of liquid fuel and fuel vapor from a fuel tank. More particularly, the present invention relates to a tank venting control valve assembly that closes automatically to prevent discharge of agitated liquid fuel from the tank or block overfilling of the tank and opens automatically after agitation of liquid fuel in the tank has subsided or refueling has been completed causing the fuel level in the tank to fall.

New fuel vapors are generated in vehicle fuel tanks during refueling due to splash and agitation of the dispensed fuel, as well as from potential temperature differences between the fuel tank and the dispensed fuel. In addition, as the liquid fuel dispensed at the pump fills the vehicle fuel tank, fuel vapors that are present in the tank and generated during refueling are displaced by liquid fuel. These displaced fuel vapors are moved out of the fuel tank vapor space by the displacing action of the liquid fuel.

In many conventional vehicle fuel systems, these displaced vapors are released directly into the atmosphere via the fuel tank filler neck and are a contributing factor to air pollution. In other vehicle fuel systems, these displaced vapors are exhausted from the fuel tank by a venting valve to a vapor recovery canister designed to capture and store fuel vapors that are displaced and generated in a fuel tank during a typical vehicle refueling operation. On-board fuel vapor recovery systems are disclosed, for example, in U S. Pat. Nos. 4,770,677; 4,816,045; and 4,836,835.

One shortcoming of typical conventional tank venting valves is that the discharge capacity of the valve is lower than that capacity necessary to vent the fuel tank properly during refueling because of small size requirements imposed on these valves. Such small size requirements are made necessary by the shortage of available space in the vicinity of the vehicle fuel tank. Inadequate discharge capacity can result in unwanted discharge of fuel vapor to the atmosphere if fuel vapor exits the tank through the filler neck or other outlet because the conventional tank pressure control valve is unable to regulate the discharge of pressurized fuel vapor to a canister or other suitable fuel vapor treatment site properly and in a timely manner.

One object of the present invention is to provide a tank pressure control valve of small size and economical construction that nevertheless is configured to discharge a substantial volume and mass of pressurized fuel vapor from a fuel tank using a minimum of moving parts during development of high vapor pressure in the tank such as occurs during refueling or the like.

Another object of the present invention is to provide a tank venting control valve assembly that automatically closes a tank venting outlet at a predetermined fuel level during tank refueling operations to prevent a fuel pump operator from overfilling the tank.

Yet another object of the present invention is to provide a valve assembly that automatically closes the tank venting outlet whenever fuel sloshes around in a vehicle fuel tank as a result of vehicle movement to prevent fuel carryover from the fuel tank through the tank venting outlet to a vapor recovery canister.

Still another object of the present invention is to provide a valve assembly that closes the tank venting outlet during fuel sloshing as required to prevent fuel carryover to the vapor recovery canister and reopens the tank venting outlet after fuel sloshing has ended or after the pressure of fuel vapor in the tank has risen to a predetermined high level.

Yet another object of the present invention is to provide a valve assembly that closes the tank venting outlet during vehicle rollover.

According to the present invention, an apparatus is provided for regulating discharge of liquid fuel and fuel vapor from a fuel tank. The apparatus includes a vent assembly coupled to the fuel tank and a first nipple movable relative to the vent assembly. The vent assembly is formed to include a venting outlet aperture. The first nipple includes a first tip configured to close the venting outlet aperture upon engagement of the first tip and the vent assembly.

The first nipple is also formed to include a bypass passageway extending therethrough to conduct fuel vapor from the fuel tank to the venting outlet aperture through an outlet opening formed in the first tip. The apparatus further includes a second nipple movable relative to each of the vent assembly and the first nipple. The second nipple includes a second tip configured to close the bypass passageway formed in the first nipple upon engagement of the first and second nipples. The first and second nipples cooperate to close the venting outlet aperture formed in the vent assembly upon movement of the first and second nipples relative to the vent assembly to predetermined closure positions so that fuel vapor in the tank is blocked from venting through the vent assembly.

The apparatus further includes means for moving the second nipple relative to the vent assembly to cause the second tip to engage the first nipple and move it upwardly to engage the vent assembly and close the venting outlet aperture. At the same time, the second tip mates with the first nipple to close the bypass passageway. The second nipple is moved by the moving means in response to rising levels of liquid fuel in the fuel tank so that liquid fuel is unable to escape from the fuel tank through the venting outlet aperture.

The moving means includes a float member buoyantly supported on liquid fuel in the fuel tank and the second nipple is coupled to the float member for movement therewith. The second tip is situated to move with the float member in an upward direction toward the first nipple as the level of liquid fuel rises in the fuel tank and in a downward direction away from the first nipple as the level of liquid fuel falls in the fuel tank.

It will be understood that the level of fuel could rise in a fuel tank, for example, either during sloshing or other agitation of fuel in the tank as might occur during vehicle movement or cornering, or during filling the tank with fuel during refueling. Of course, the level of fuel in a fuel tank could fall whenever fuel sloshing or agitation ends or as fuel is pumped out of the tank and used in the vehicle engine. The float member (and the second nipple appended thereto) will move in an upward direction in the tank whenever the fuel level therein rises and in a downward "sinking" direction whenever the fuel level therein falls.

In operation, the buoyant float member will move around in the fuel tank, for example, as liquid fuel is sloshed around in the tank or introduced into the tank, to move the first and second nipples upwardly in the manner described above to close the venting outlet aperture formed in the vent assembly. Advantageously, such blockage of the venting outlet aperture is effective to prevent liquid fuel carryover from the fuel tank to a fuel vapor recovery canister connected to the fuel tank through the vent assembly.

Further, the first and second nipples move in sequence to reopen the venting outlet aperture quickly whenever the float member sinks because fuel sloshing ends or the fuel level in the fuel tank decreases and risk of liquid fuel carryover to the vapor recovery canister is lessened. Such reopening of the venting outlet aperture allows pressurized fuel vapor in the fuel tank once again to vent freely from the tank to the vapor recovery canister at a maximum rate.

The venting outlet aperture is reopened typically in the following manner. As the float member sinks, the second nipple moves downwardly away from the first nipple causing the second tip to move away from its position closing the bypass passageway. Following such downward movement of the second nipple, pressurized fuel vapor can once again be vented from the fuel tank through the bypass passageway formed in the first nipple even while the first nipple remains in its closed position, closing the venting outlet aperture.

Advantageously, such venting through the bypass passageway will expose the first tip of the first nipple to pressurized fuel vapor from the tank and this pressurized fuel vapor will bear against the first tip to apply a downward force to the first nipple which will assist in positively moving the first nipple away from its closed position to an opened position allowing maximum venting of fuel vapor through the venting outlet aperture in the vent assembly. The apparatus also includes flange means that is arranged to move with the float member so that it engages arm means appended to the first nipple as the float member sinks in the fuel tank in response to falling levels of liquid fuel therein so that the first nipple is moved downward relative to the vent assembly by the float member to cause the first tip of the first nipple to disengage the vent assembly, thereby opening the venting outlet aperture.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 5b is a view similar to FIG. 5a showing movement of the diaphragm-mounted pressure-release valve away from its seated position to open the venting outlet aperture formed therein even though the first nipple remains in its highest position shown in FIG. 5a.

DETAILED DESCRIPTION OF THE DRAWINGS

Figure 1:
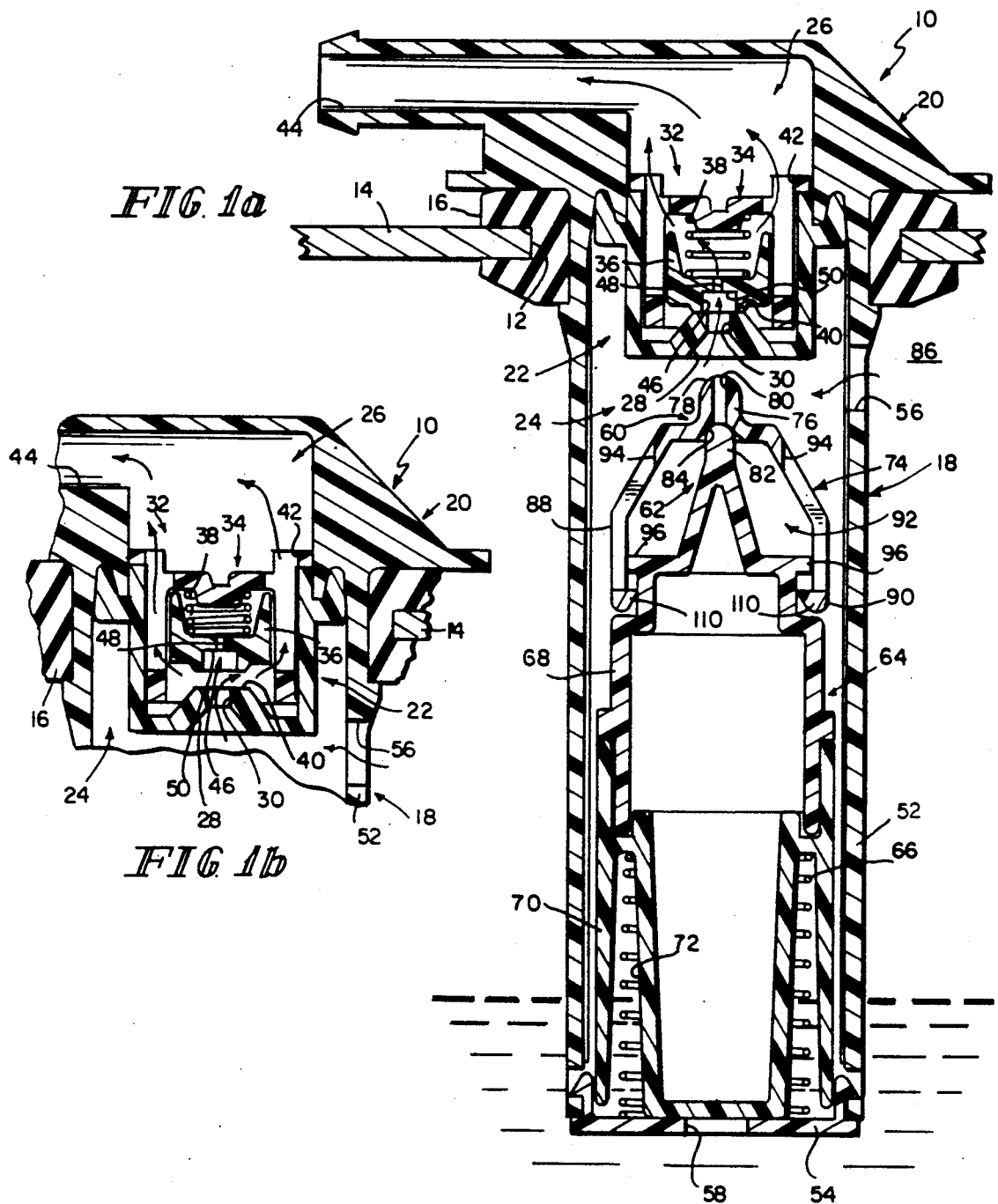
FIG. 1a is a sectional detail view of one embodiment of an apparatus in accordance with the present invention showing a pressure-relief valve above a venting outlet aperture and first and second nipples positioned to allow "first stage" venting of pressurized fuel vapor from the fuel tank at a first rate.
FIG. 1b is a view similar to FIG. 1a showing movement of the pressure-relief valve away from a venting outlet aperture to allow "second stage" venting of pressurized fuel vapor from the fuel tank at a greater second rate.

A valve assembly 10 is mounted in an aperture 12 formed in a fuel tank 14 to regulate flow of liquid fuel and fuel vapor from the tank 14 to a vapor recovery canister (not shown) or other destination outside of the tank 14. A grommet 16 is provided in aperture 12 to establish a sealed connection between the tank 14 and the valve housing 18 disposed inside of tank 14 and a vent housing 20 situated outside of tank 14. The valve assembly 10 operates automatically to vent fuel vapor from the tank whenever the pressure exceeds a predetermined magnitude and prevent discharge of liquid fuel and fuel vapor from the tank 14 through the valve assembly 10 either during agitation of liquid fuel in the tank 14 or during refueling.

A partition 22 is situated in the upper interior region of the valve housing 18 to divide a passageway through the valve assembly 10 into a valve chamber 24 in the valve housing 18 and a vent chamber 26 in the vent housing 20. The partition 22 includes a upstream valve seat 28 that is arranged to face into the interior valve chamber 24. The upstream valve seat 28 is formed to include a venting outlet aperture 30 through which fuel vapor can flow from the valve chamber 24 to reach the vent chamber 26.

A pressure discharge control assembly 32 is provided in vent chamber 26 to regulate the flow of pressurized fuel vapor that is able to enter into the vent chamber 26 through the venting outlet aperture 30. Control assembly 32 includes a foundation 34 mounted in a cavity formed in partition 22, a pressure-relief valve 36 movable relative to foundation 34 and partition 22, and a spring 38 acting against the foundation 34 and arranged to move the pressure-relief valve 36 normally into engagement with a downstream valve seat 40 provided on partition 22 as shown in FIG. 1a. Foundation 34 is formed to include a plurality of vertically extending passages 42 around pressure-relief valve 36 through which pressurized fuel vapor passes on its way from the venting outlet aperture 30 to a vapor discharge outlet 44 of the vent housing 20.

Pressure discharge control assembly 32 is a two-stage valve that operates to vary the rate at which pressurized fuel vapor is discharged from the valve chamber 24 in the tank 14 into the vent chamber 26 as a function of the pressure of fuel vapor passing through the venting outlet aperture 30 to reach the pressure-relief valve 36. Essentially, the pressure-relief valve 36 is movable relative to the downstream valve seat 40 on partition 22 to vary the volume and mass of pressurized fuel vapor that is discharged from tank 14 into vent chamber 26. Control assembly 32 is an optional part of valve assembly 10 and can include one or more venting stages.

A "first stage" of venting is shown in FIG. 1a and a "second stage" of venting is shown in FIG. 1b. The pressure-relief valve 36 is formed to include a cavity 46 located to receive fuel vapor discharged from the tank 14 through the venting outlet aperture 30 and a central aperture 48 situated to conduct fuel vapor through the pressure-relief valve 36 from the cavity 46 into the vent chamber 26. During first-stage venting, pressurized fuel vapor passes only through central aperture 48 to reach vent chamber 26 when the pressure-relief valve 36 is biased by spring 38 into sealing engagement with downstream valve seat 40 on partition 22. In a preferred embodiment, the inner diameter of central aperture 48 is about half the size of the internal diameter of venting outlet aperture 30.

During second-stage venting, the pressure of the fuel vapor in cavity 46 is high enough to apply a force to a floor 50 in cavity 46 that is sufficient to move the pressure-relief valve 36 against the bias of spring 38 to an opened position away from downstream valve seat 40. In this second stage, the pressure-relief valve 36 can be moved to a position where it does not significantly restrict the rate at which pressurized fuel vapor is able to leave the fuel tank 14 through the venting outlet aperture 30.

The valve housing 18 extends downwardly into the fuel tank 14 from a top wall thereof and includes a cylindrical side wall 52 and a bottom closure member 54 connected thereto as shown in FIG. 1a. The side wall 52 is formed to include at least one upper opening 56 near the location of the partition 22 to permit fuel vapor to flow into the valve chamber 24 from the fuel tank 14 even when the tank 14 is filled to capacity with liquid fuel as shown, for example, in FIG. 4. The bottom closure member 54 is formed to include a central aperture 58 through which liquid fuel can pass to travel from the tank 14 into the valve chamber 24 as shown, for example, in FIG. 2a.

A first nipple 60, second nipple 62, float member 64, and rollover spring 66 are arranged in the valve chamber 24 of valve housing 18 and movable therein to control the discharge of liquid fuel and pressurized fuel vapor from the fuel tank 14 through the venting outlet aperture 30 during, for example, sloshing of liquid fuel in the fuel tank 14 as a result of vehicle movement or cornering, development of high pressure of fuel vapor in the fuel tank 14, filling the fuel tank 14 with liquid fuel during refueling, and tilting or inversion of the vehicle containing the tank 14 as a result of vehicle rollover. Although valve or plug members 60, 62 have a nipple shape in the illustrated embodiments, it will be understood that other valve member shapes could be used within the scope of the present invention. The float member 64 includes a top shell 68 formed to include the second nipple 62 at its upper end and a base shell 70 formed to include a downwardly opening annular cavity 72 sized to receive the coiled rollover spring 66 therein.

The first nipple 60 includes a frame assembly 74 coupled to the float member 64 to permit relative movement therebetween and a closure member 76 at its tip. The closure member 76 is appended to the frame assembly 74 to face toward the upstream valve seat 28 formed in partition 22. The closure member 76 includes a rounded outer surface 78 configured to fit closely against the conically shaped upstream valve seat 28 so that liquid fuel and fuel vapor are unable to pass between the partition 22 and the first nipple 60 upon sealing engagement of the closure member 76 and the upstream valve seat 28 as shown in FIG. 2a. However, the closure member 76 is formed to include a bypass passageway 80 extending therethrough to permit the flow of some fuel vapor from the valve chamber 24 into the vent chamber 26 through the venting outlet aperture 30 when the closure member 76 is nested against the upstream valve seat 28 to establish a seal therebetween as shown in FIG. 2b. In a preferred embodiment, the inner diameter of the bypass passageway 80 is about half the size of the inner diameter of the venting outlet aperture 30.

The second nipple 62 includes a solid closure member 82 at its tip that faces toward a downwardly facing, conically shaped valve seat 84 formed at the inlet end of bypass passageway 80. The closure member 82 is sized and shaped to block flow of liquid fuel vapor from valve chamber 24 through bypass passageway 80 upon sealing engagement of the solid closure member 82 of the second nipple 62 and the valve seat 84 of the first nipple 60. As shown in FIG. 2a, the closure members 76, 82 of the first and second nipples 60, 62 are movable relative to each other and to partition 22 to assume nested positions blocking flow of liquid fuel and fuel vapor through the venting outlet aperture 30 to protect the vapor-recovery canister (not shown) connected to vapor discharge outlet 44 of vent housing 20 from liquid fuel carryover and to maintain a proper pressure head in the vapor space 86 in the fuel tank 14 during refueling.

The frame assembly 74 of the first nipple 60 includes a radially outwardly extending and axially downwardly extending side wall 88 that terminates at an annular base 90 and provides the frame assembly 74 with an inverted cup-like shape. The frame assembly 74 is formed to include an interior region 92 sized to receive the second nipple 72 therein as shown in FIG. 1a. A plurality of windows 94 are formed in the side wall 88 to allow fuel vapor in the valve chamber 24 to pass into the interior region 92 on its way to the bypass passageway 80 (as long as the second nipple 62 is not moved to its closed position) as shown best in FIGS. 2b and 2c.

A release flange 96 is appended to the top shell 68 of the float member 64 and arranged to lie in the interior region 92 of the frame assembly 74 as shown best in FIG. 2a. The release flange 96 extends in a radially outward direction to provide a downwardly facing surface 98 that faces toward an upwardly facing surface 100 provided on a radially inwardly extending lip or arm member 110 appended to the annular base 90 of frame assembly 74. Sufficient downward movement of float member 64 in fuel tank 14 will cause the release flange 96 to engage the lip 110 and pull the first nipple 60 away from engagement with the upstream valve seat 28, thereby opening the venting outlet aperture 30 as shown in FIGS. 2b and 2c. Of course, such downward movement of the float member 64 typically only happens when fuel is not sloshing around in tank 14 and the risk of liquid fuel carryover to the vapor-recovery canister (not shown) is low or when the fuel level in the tank 14 is being consumed in the vehicle engine (not shown) and no tank refueling is taking place.

In operation, the first and second nipples 60, 62 cooperate to block flow of both liquid fuel and fuel vapor out of the fuel tank 14 through the venting outlet aperture 30 during certain circumstances. If the level of liquid fuel in the fuel tank 14 is low and undisturbed as shown in FIG. 1a, then the float member 64 is inactive and an inner section of its base shell 70 rests on bottom closure member 54 so that the first and second nipples 60, 62 are kept away from engaging the partition 22 and closing the venting outlet aperture 30. As shown in FIG. 1a, fuel vapor in fuel tank 14 is thus able to vent through the venting outlet aperture 30 to reach the vent chamber 26 in vent housing 20. Typically, the vapor-discharge outlet 44 of vent chamber 26 is connected to a vapor-recovery canister (not shown) so that fuel vapor discharged from fuel tank 14 through valve assembly 10 can be recovered and used.

As described above, fuel vapor passing out of fuel tank 14 through the venting outlet aperture 30 is always able to pass through the open central aperture 48 formed in pressure-relief valve 36 even though the level of pressure of the fuel vapor in the fuel tank 14 is low. Accordingly, in a first stage of venting shown in FIG. 1a, pressurized fuel vapor in fuel tank 14 is always able to reach the vapor-recovery canister (not shown) connected to the vapor-discharge outlet 44 of vent housing 20.

A second stage of venting is also permitted to accommodate generally unrestricted venting of pressurized fuel vapor from venting outlet aperture 30 into vent chamber 26. If the pressure of fuel vapor in the tank 14 rises substantially, this highly pressurized fuel vapor will pass through the opened venting outlet aperture 30 as shown in FIG. 1b and lift the pressure-relief valve 36 upwardly against the bias provided by spring 38 to permit more fuel vapor to escape into the vent chamber 26. The pressure-relief valve 36 will remain in an opened position supported by the pressurized fuel vapor exiting tank 14 through venting outlet aperture 30 until the pressure of the fuel vapor in cavity 46 decreases enough so that the spring 38 will return the pressure-relief valve 36 to its first-stage position engaging the valve seat 40.

Occasionally, liquid fuel is agitated during operation of the vehicle (not shown) containing fuel tank 14. Such agitation often occurs during movement of the vehicle, especially during cornering, and can cause liquid fuel to slosh around inside fuel tank 14 as shown, for example, in FIG. 2a. Float member 64 is buoyant enough to float upwardly toward partition 22 on the crest of a liquid fuel wave as shown in FIG. 2a to cause first and second nipples 60, 62 to cooperate to close venting outlet aperture 30. Upward movement of float member 64 causes the second nipple 62 to engage the downwardly facing valve seat 84 on first nipple 60 and drive the first nipple 60 in an upward direction until the rounded outer surface 78 of closure member 76 seats against the upstream valve seat 28 formed in partition 22. At the same time, the solid closure member 82 of the second nipple 62 closes the normally open inlet of bypass passageway 80 so that liquid fuel is unable to flow through bypass passageway 80 to reach venting outlet aperture 30. As shown in FIG. 2a, escape of liquid fuel and fuel vapor from fuel tank 14 into vent chamber 20 is blocked because a first fluid and vapor seal is established between upstream valve seat 28 and the rounded outer surface 78 of first nipple 60 and a second liquid fuel and fuel vapor seal is established between valve seat 84 on first nipple 60 and solid closure member 82 of second nipple 62.

It will be understood that the movement of first and second nipples 60, 62 to block flow of liquid fuel and fuel vapor out of the fuel tank through venting outlet aperture 30 will occur only when the level of liquid fuel in the tank rises enough to move the float member 64 to the position shown in FIG. 2a. As soon as the fuel sloshing subsides and the risk of liquid fuel carryover to the vapor-recovery canister (not shown) through the venting outlet aperture 30 is reduced, then the float member 64 will sink under its own weight and the weight of second nipple 62 toward its rest position shown in FIG. 1a to allow the first and second nipples 60, 62 to move to their venting positions as shown in FIGS. 2b and 2c.

It has been observed during the course of the development of the present invention that valves which are movable to engage overlying valve seats and close venting apertures formed in such valve seats have a tendency to remain in the closed position during high tank pressure because of a high pressure differential acting on such a valve. This is especially evident in cases where the venting aperture has a relatively large inner diameter. The two-nipple and bypass passageway system of the present invention is designed to allow some pressurized fuel vapor to vent through bypass passageway 80 in such a way as to help unseat first nipple 60 from its nested position against upstream valve seat 28 in case first nipple 60 becomes temporarily "held" in its closed position by the above-described pressure differential.

Figure 2:
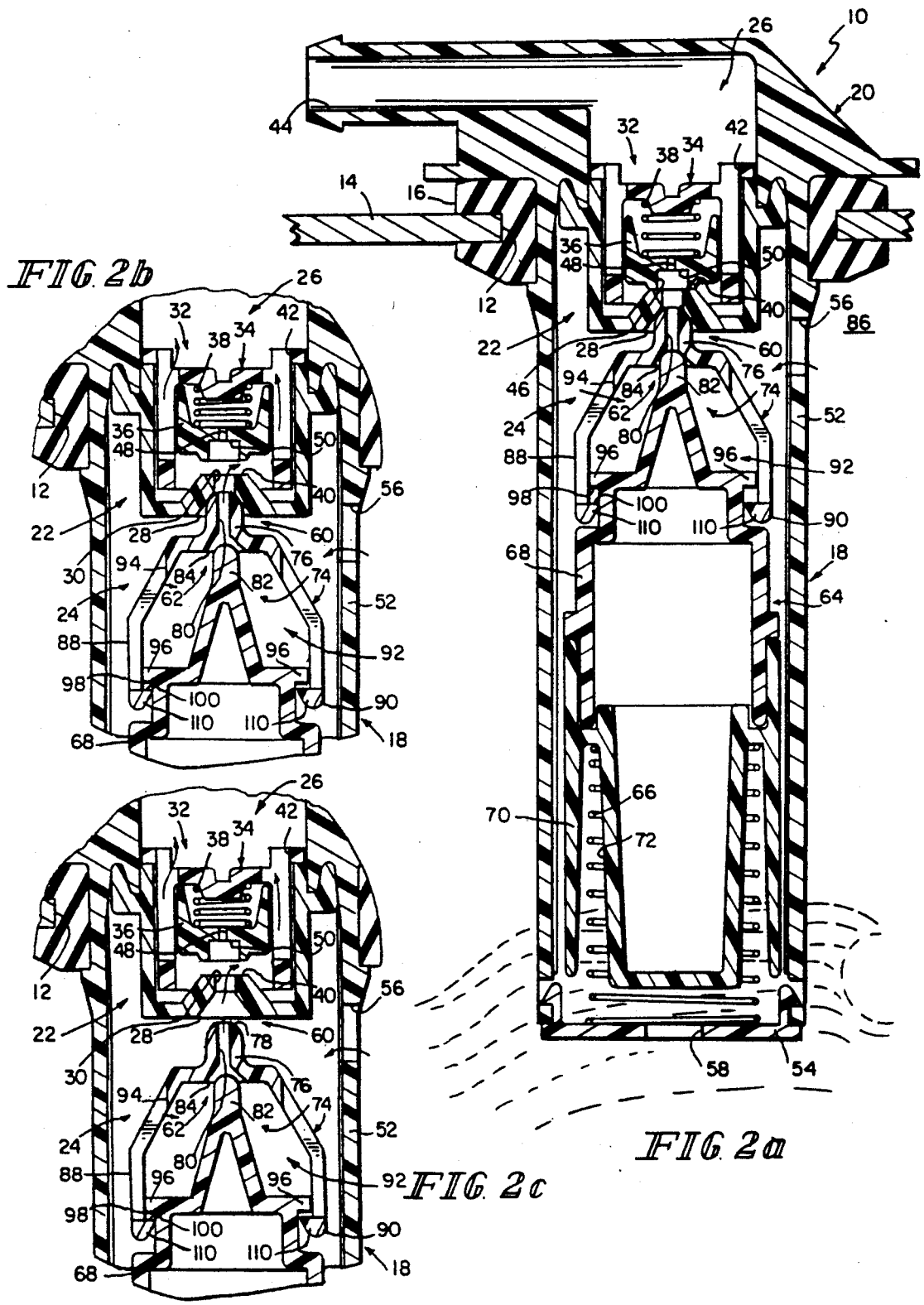
FIG. 2a is a view similar to FIG. 1a showing upward movement of a float member during fuel sloshing or the like to move the first and second nipples in an upward direction to close the venting outlet aperture so that liquid fuel carryover from the fuel tank is prevented.
FIG. 2b is a view similar to FIG. 2a showing later downward movement of the float member and the attached second nipple in response to falling levels of liquid fuel in the tank to open a bypass passageway in the first nipple so that fuel vapor can vent through the bypass passageway while the first nipple remains in its closed position.
FIG. 2c is a view similar to FIGS. 2a and 2b showing downward movement of the first nipple to an opened position allowing maximum venting through the venting outlet aperture as a result of a downward force applied to the first nipple, at least in part, by outwardly extending flanges provided on the float member as the second nipple and the float member sink in the fuel tank.
Figure 3:
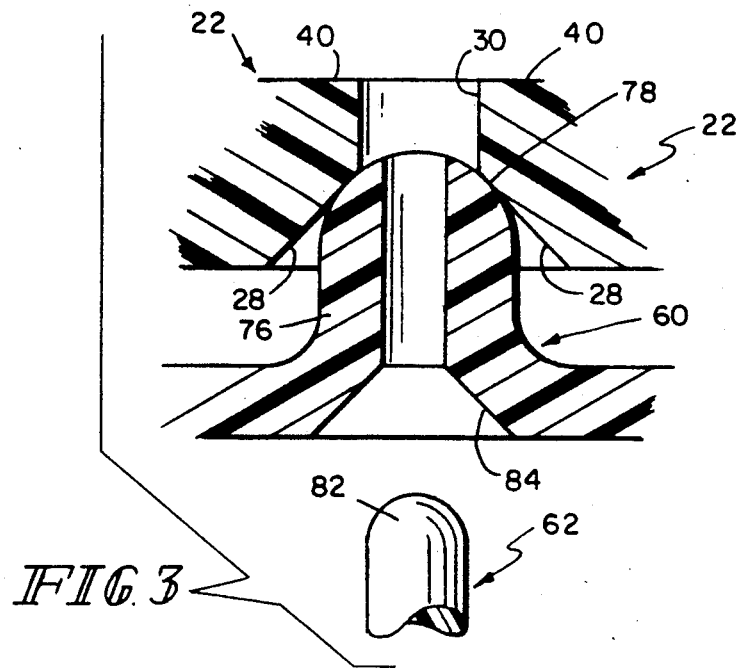
FIG. 3 is an enlarged diagrammatic view of the first and second nipples showing the relative sizes of the nipples and of the venting outlet aperture and the bypass passageway.

As shown in FIG. 2b, float member 64 has begun to move downwardly in the fuel tank 14 from the position shown in FIG. 2a because sloshing of fuel in fuel tank 14a has subsided and the level of fuel exposed to the float member 64 has decreased. The second nipple 62 is appended to the top shell 68 of float member 64 and moves in a downward direction along with float member 64. Solid closure member 82 on the second nipple 62 is small enough in size that it typically does not experience any problems in moving to an opened position. As soon as the second nipple 62 moves downwardly with the float member 64 under the force of gravity, solid closure member 82 easily disengages valve seat 84 to permit flow of some pressurized fuel vapor in the interior region 92 of frame assembly 74 to pass into the inlet of bypass passageway 80 and travel through the venting outlet aperture 30 in a direction toward the pressure-relief valve 36. As described above, the inner diameter of bypass passageway 80 is about half the size of the inner diameter of the venting outlet aperture 30. Accordingly, a portion of the rounded outer surface 78 of the closure member 76 on first nipple 60 will be exposed to the higher pressure of this pressurized fuel vapor vented through bypass passageway 80. This vented pressurized fuel vapor will act to apply a downward force to the rounded outer surface 78 that is sufficient to assist in moving the first nipple 60 from the seated position shown in FIG. 2 to the unseated position shown in FIG. 2c.

At or about the same time, the release flange 96 appended to the top shell 68 of the sinking float member 64 will engage the radially inwardly extending lip 110 on the frame assembly 74. As float member 64 continues to move in a downward direction, this engagement of release flange 96 and lip 110 will cause float member 64 to pull first nipple 60 positively away from engagement with partition 22 to the unseated position shown in FIG. 2c. Accordingly, it will be appreciated that (1) the cooperation of the second nipple 62 and the bypass passageway 80 provides a pressure in the venting outlet aperture 30 that is high enough to apply a downward force to the rounded outer surface 78; and (2) the action of the release flange 96 to pull the first nipple 60 away from engagement with the partition 22 help to open the venting outlet aperture 30 quickly to allow maximum venting of pressurized fuel vapor through the large venting outlet aperture 30 as soon as the fuel level in the tank 14 drops to a safe level. It will be understood that during sloshing of fuel in fuel tank 14 the venting outlet aperture 30 could be closed and opened by the first and second nipples 60, 62 under the control of float member 64 intermittently. This control mechanism is very sensitive to rising and falling levels of fuel in fuel tank 14 and functions quite well to prevent any liquid fuel carryover from fuel tank 14 to a vapor-recovery canister (not shown) through venting outlet aperture 30.

Figure 4:
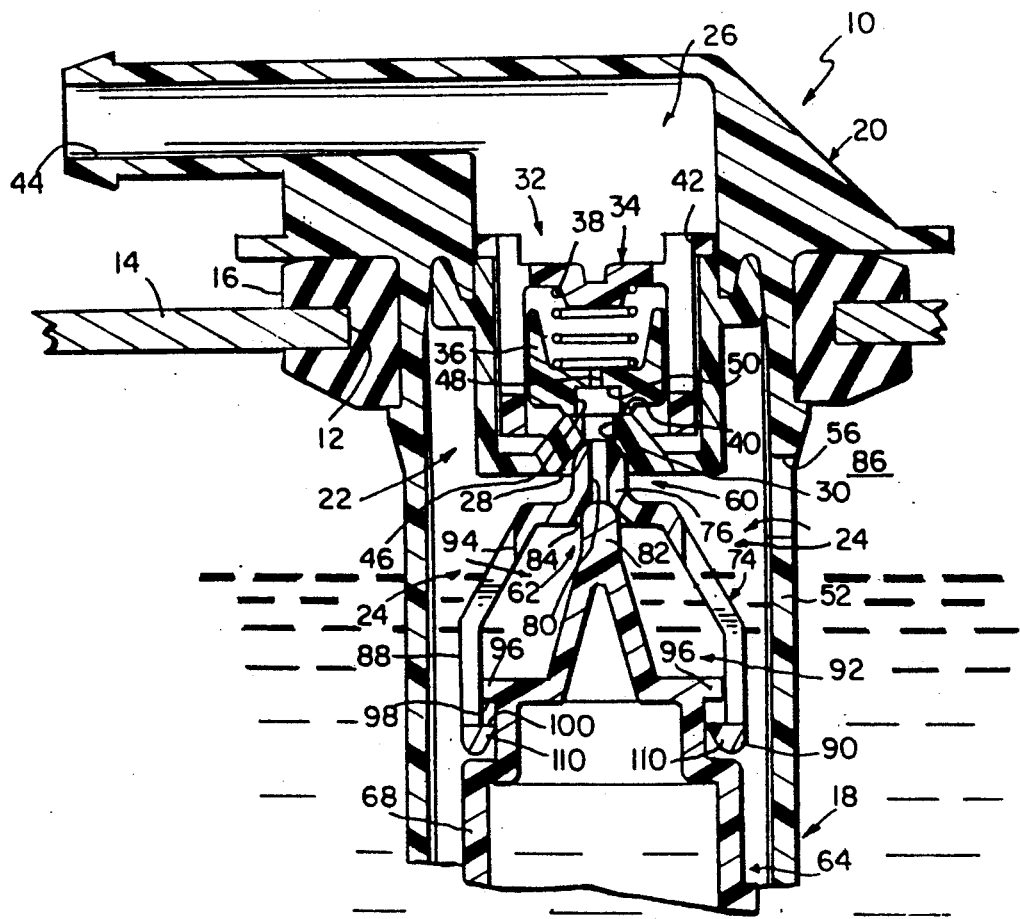
FIG. 4 is a view similar to FIG. 1a showing upward movement of the float member and the first and second nipples to close the venting outlet aperture upon filling the fuel tank to a predetermined maximum level during refueling.

The valve assembly 10 also operates to close venting outlet aperture 30 during refueling of fuel tank 14 whenever the tank 14 has been filled by a pump operator to its maximum rate of capacitY. As shown in FIG. 4, the level of fuel in the fuel tank has risen to a level high enough to cause float member 64 to float upwardly toward partition 22 so that the second nipple has closed bypass passageway 80 and moved first nipple 60 to a position sealingly engaging upstream valve seat 28. At this point, pressurized fuel vapor is unable to vent from vapor space 86 in fuel tank 14 through venting outlet aperture 30. This causes the pressure in vapor space 86 to increase to a level high enough to cause liquid fuel in the fuel tank 14 to start to "back up" through the fuel tank filler neck (not shown) to a point sufficient to activate a nozzle shut-off mechanism (not shown) connected to the pump nozzle (not shown). This liquid fuel backup in the filler neck causes the pump nozzle to shut off automatically and prevent overfilling of the fuel tank 14. Reference is hereby made to U.S. Pat. No. 4,760,855 for a more detailed description of the operation of a fuel tank overfill limiting mechanism.

In the case of vehicle rollover, the rollover spring 66 will act against the bottom closure member 54 of valve housing 18 to urge the buoyant float member 64 toward the partition 22. The rollover spring 66 is strong enough to push float member 64 against liquid fuel around partition 22 during vehicle rollover or the like to move the first and second nipples 60, 62 to their positions closing the venting outlet aperture 30. Such closure is effective to prevent leakage of liquid fuel from fuel tank 14 through valve assembly 10 during vehicle rollover or the like.

Figure 5A:
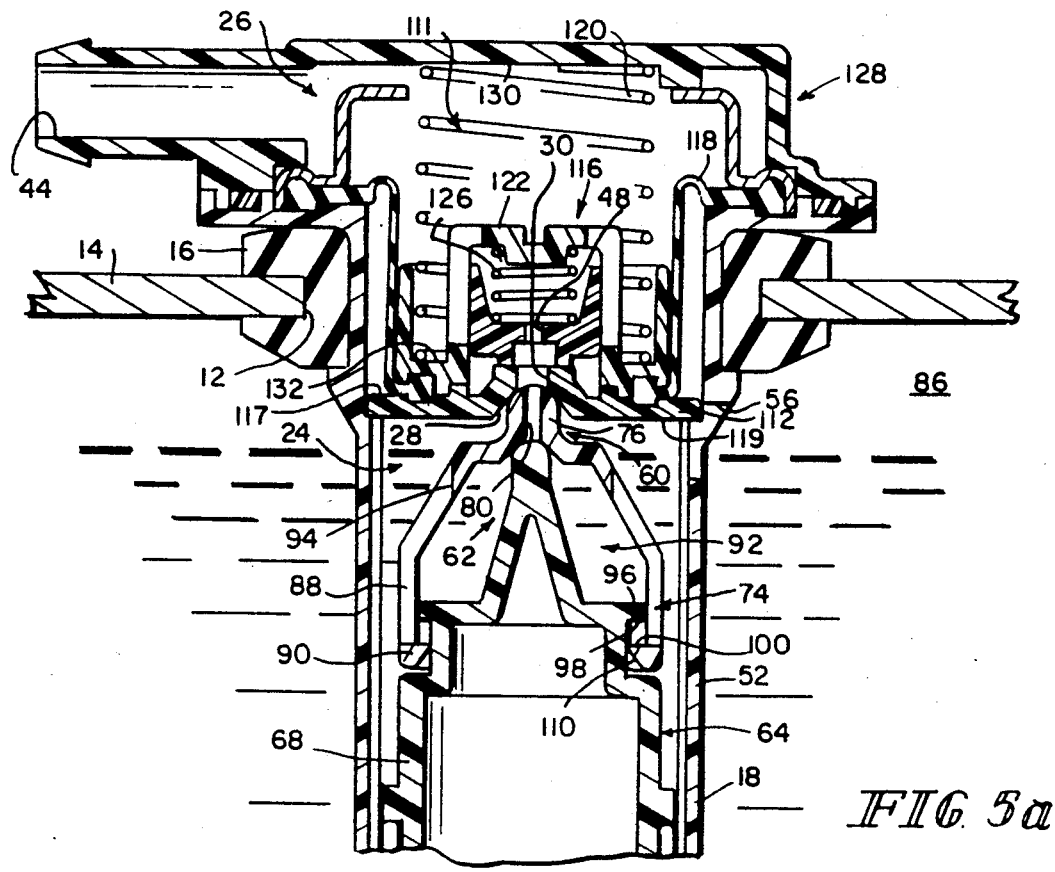
FIG. 5a is a sectional detail view of an apparatus in accordance with another embodiment of the present invention showing a diaphragm-mounted pressure-release valve biased to a seated position engaging the first nipple when the fuel tank is filled to its rated capacity.
Figure 5B:
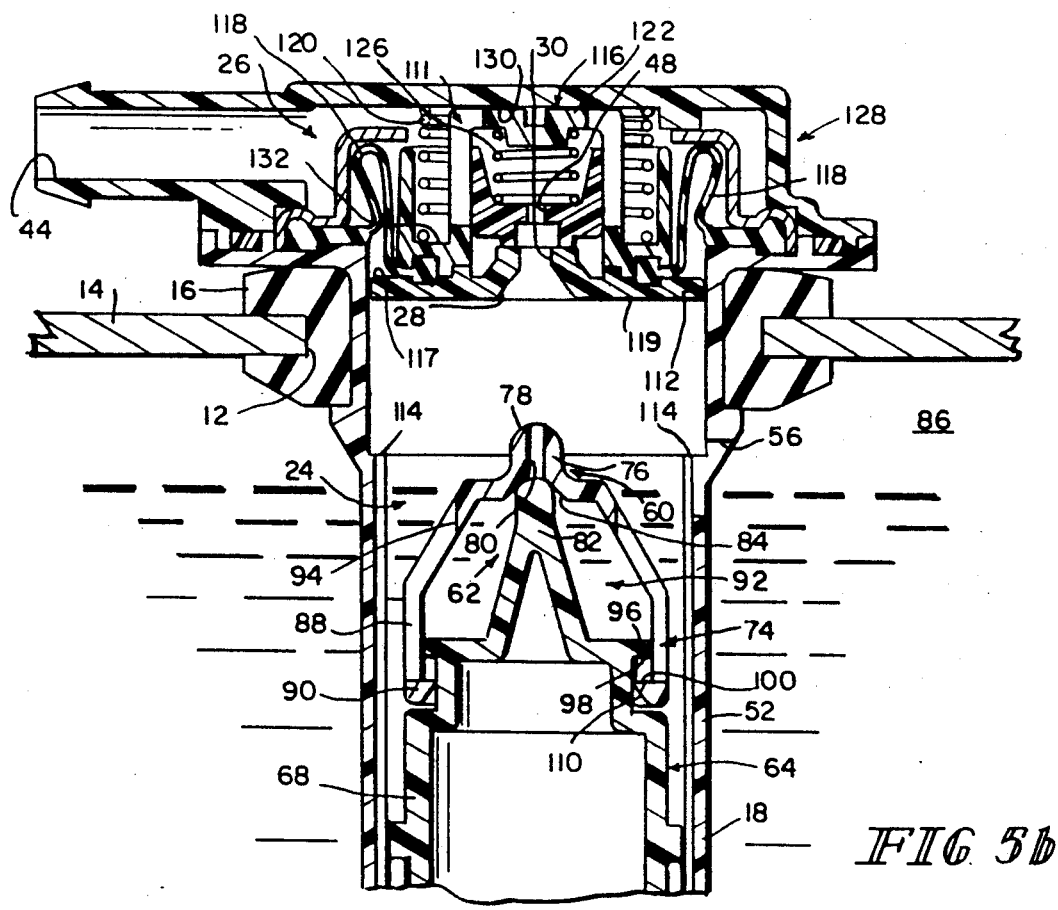

A second embodiment of the invention is shown in FIGS. 5a and 5b. In this embodiment, the partition separating the valve chamber 24 from the vent chamber 26 has been changed somewhat from the embodiment of FIGS. 1-4 to permit highly pressurized fuel vapor to vent from vapor space 86 to vent chamber 26 even when the fuel tank 14 is filled with liquid fuel to its maximum rated capacity. It will be understood that the operation of float member 64, first nipple 60, and second nipple 62 to open and close the venting outlet aperture 30 in the embodiment of FIGS. 5a and 5b is similar to the operation of those elements in connection with the embodiment of FIGS. 1-4.

Referring now to FIG. 5a, it will be seen that partition means 111 is configured to be movable relative to the vent housing 128 between a normally seated position shown in FIG. 5a and an unseated venting position shown in FIG. 5b. Partition means 111 includes a partition plate 112 seatable against a plate seat 114 formed in valve housing 18, a two-stage valve assembly 116 appended to a downstream side 117 of partition plate 112 to control flow of pressurized fuel vapor from venting outlet 30 into vent chamber 26, and a pliable resilient diaphragm 118. The outer peripheral edge of diaphragm 118 is rigidly attached to vent housing 128 and the inner central portion of diaphragm 118 is attached to the downstream side 117 of partition plate 112.

As shown in FIG. 5a, the level of fuel in fuel tank 14 has risen to its maximum level and caused float member 64 to float upwardly to a position moving first and second nipples 60, 62 to their closed positions blocking any further flow of pressurized fuel vapor from vapor space 86 through venting outlet aperture 30. As was described previously, it is necessary to maintain a predetermined pressure head in vapor space 86 in order to cause liquid fuel to back up from the fuel tank 14 into a tank filler neck (not shown) to actuate the nozzle shut-off mechanism provided in the pump nozzle. However, in some cases it might be advantageous to vent pressurized fuel vapor from vapor space 86 through venting outlet aperture 30 even during refueling.

As shown in FIG. 5b, the fuel vapor pressure in vapor space 86 has risen to a magnitude sufficient to apply an upward force to the upstream side 119 of partition plate 112, which force is sufficient to move the partition plate 112 upwardly against the bias provided by spring 120. Spring 120 is positioned to act between top wall 130 of vent housing 128 and an upwardly facing wall 132 of support base 122. Upward movement of partition plate 112 against spring 120 causes upstream valve seat 28 to disengage from rounded outer surface 78 on first nipple 60. Such disengagement opens venting outlet aperture 30 so that pressurized fuel vapor in vapor space 86 can escape through venting outlet aperture 30 because vapor space 86 communicates with venting outlet aperture 30 through upper opening 56 in the cylindrical side wall 52 of the valve housing 18 and through the valve chamber 24.

Because partition plate 112 is movable away from its seated position against plate seat 114 formed in cylindrical side wall 52, it is unnecessary for first nipple 60 to move downwardly in the fuel tank 14 away from its engaged position with valve seat 28. Of course, the buoyant character of float member 64 would make it difficult to move first nipple 60 in such a downward direction. Advantageously, the partition means 111 include the flexible diaphragm 118 which is arranged to permit upward movement of partition plate 112 against spring 120 whenever the fuel vapor pressure in vapor space 86 rises to magnitude higher than a predetermined pressure level.

The two-stage valve assembly 116 is responsible for controlling venting of pressurized fuel vapor from venting outlet aperture 30 into the downstream vent chamber 26. This valve assembly 116 includes a support base 122 (which is illustratively similar to the foundation 34 shown in connection with the embodiment of FIGS. 1-4), a pressure-relief valve 124, and a spring 126 for biasing pressure-relief valve 124 to its normally closed position against the downstream side of partition plate 112. Pressure-relief valve 124 is optionally formed to include a central aperture 48 therein which functions in the same manner as central aperture 48 in the embodiment of FIGS. 1-4 to provide first-stage venting. Movement of the pressure-relief valve 124 away from engagement with partition plate 112 provides second-stage venting when necessary.

Although the invention has been described in detail with reference to certain preferred embodiments, variations and modifications exist within the scope and spirit of the invention as described and defined in the following claims.

What is claimed is:

1. An apparatus for regulating discharge of liquid fuel and fuel vapor from a fuel tank, the apparatus comprising
  a vent assembly coupled to the fuel tank and formed to include a venting outlet aperture,
  a first valve movable relative to the vent assembly and including a first tip configured to close the venting outlet aperture upon engagement with the vent assembly, the first valve being formed to include a bypass passageway extending therethrough and conducting fuel vapor from the fuel tank to the venting outlet aperture through an outlet opening formed in the first tip, and
  a second valve movable relative to the vent assembly and including a second tip configured to close the bypass passageway upon engagement with the first valve.

2. The apparatus of claim 1, further comprising means for moving the second valve relative to the vent assembly to cause the second tip to engage the first valve and close the bypass passageway in response to rising levels of liquid fuel in the fuel tank so that liquid fuel is unable to escape from the fuel tank through the venting outlet aperture.

3. The apparatus of claim 2, wherein the moving means includes a float member buoyantly supported on liquid fuel extant in the fuel tank, the second valve is coupled to the float member for movement therewith, and the second tip is situated to move toward the first valve as the level of liquid fuel rises in the fuel tank and away from the first valve as the level of liquid fuel falls in the fuel tank.

4. The apparatus of claim 3, wherein the first valve further includes arm means and the float member includes flange means for engaging the arm means as the float member sinks in the fuel tank in response to falling levels of liquid fuel therein so that the first valve is moved relative to the vent assembly to cause the first tip to disengage the vent assembly, thereby opening the venting outlet aperture.

5. The apparatus of claim 2, wherein the first valve is formed to include a valve seat facing toward the second tip of the second nipple and defining an inlet opening of the bypass passageway and the second tip is configured to seat against the valve seat to close the inlet opening and move the first valve to its position closing the venting outlet aperture as the liquid fuel level in the fuel tank rises above a predetermined level.

6. The apparatus of claim 5, wherein the vent assembly includes a valve seat facing toward the first tip of the first valve and defining the venting outlet aperture, the outlet opening formed in the first tip is located to open into the venting outlet aperture upon movement of the first tip to sealingly engage the valve seat of the vent assembly to permit fuel vapor to be discharged from the fuel tank through the venting outlet aperture via the bypass passageway upon disengagement of the second tip of the second valve and the valve seat of the first valve.

7. The apparatus of claim 1, wherein the vent assembly includes a valve seat facing toward the first tip of the first valve and defining the venting outlet aperture, the first tip is positioned to engage the valve seat during movement of the first valve toward the vent assembly to close the venting outlet aperture, and the outlet opening of the bypass passageway in the first tip is located to open into the venting outlet aperture.

8. The apparatus of claim 7, further comprising means for moving the second tip to close the bypass passageway in response to variation of the fuel level in the fuel tank so that liquid fuel is unable to escape from the fuel tank through the venting outlet aperture.

9. The apparatus of claim 8, wherein the moving means is a float member buoyantly supported on liquid fuel extant in the fuel tank.

10. The apparatus of claim 1, further comprising means for moving the second valve into engagement with the first valve to move the first tip to its position closing the venting outlet aperture and the second tip to its position closing the bypass passageway so that liquid fuel is unable to escape from the fuel tank through the venting outlet aperture.

11. The apparatus of claim 10, wherein the moving means includes a float member buoyantly supported on liquid fuel extant in the fuel tank.

12. An apparatus for regulating discharge of liquid fuel and fuel vapor from a fuel tank, the apparatus comprising
  means for venting fuel vapor from the fuel tank to a outside space,
  a first valve formed to include first closure means for closing the venting means in response to engagement of the first valve and the venting means and means extending through the first closure means for bypassing the first closure means to conduct fuel vapor from the fuel tank to the outside space during engagement of the first valve and the venting means, and
  a second valve including second closure means for closing the bypassing means in response to rising levels of liquid fuel in the fuel tank so that liquid fuel is unable to escape from the fuel tank through the bypassing means.

13. The apparatus of claim 12, wherein the second closure means includes a tip sized to close the bypassing means upon engagement therewith and a float member buoyantly supported on liquid fuel extant in the fuel tank and coupled to the tip for movement therewith.

14. The apparatus of claim 13, wherein the tip is configured to provide means for moving the first nipple relative to the venting means to cause the first closure means to close the venting means in response to movement of the tip to its position engaging and closing the bypassing means.

15. The apparatus of claim 12, wherein the second valve further comprises means for positively moving the first valve relative to the venting means to open the venting means in response to falling levels of liquid fuel in the fuel tank.

16. The apparatus of claim 12, further comprising means for permitting relative movement between the first and second valves so that the second closure means moves relative to the first valve to open the bypass means in response to falling levels of liquid fuel in the fuel tank even while the first valve remains in a position closing the venting means so that fuel vapor extant in the fuel tank can escape to the venting outlet aperture through the bypass means.

17. An apparatus for regulating discharge of liquid fuel and fuel vapor from a fuel tank, the apparatus comprising
 means for venting fuel vapor from the fuel tank, the venting means including a valve seat defining a venting outlet aperture,
 means for closing the venting outlet aperture to prevent expulsion of liquid fuel and fuel vapor from the fuel tank therethrough, the closing means including a plug member movable between a closed position engaging the valve seat to block flow of fuel vapor from the fuel tank through the venting outlet aperture and an opened position disengaging the valve seat to allow flow of fuel vapor from the fuel tank through the venting outlet aperture, the plug member being formed to include means for conducting fuel vapor from the fuel tank through the venting outlet aperture upon movement of the plug member to its closed position against the valve seat, and means for blocking flow of liquid fuel and fuel vapor through the conducting means, the blocking means being movable relative to the plug member between flow-blocking and flow-delivery positions, and
 float means coupled to the blocking means for moving the blocking means against the plug member so that the blocking means moves to its flow-blocking position and the plug member moves to its closed position in response to rising levels of liquid fuel in the fuel tank, the float means being buoyantly supported in liquid fuel in the fuel tank and movable relative to the plug member to move the blocking means relative to the plug means to its flow-delivery position in response to falling levels of liquid fuel in the fuel tank, thereby allowing pressurized fuel vapor to be vented from the fuel tank through the conducting means and the venting outlet aperture even while the plug member remains in its closed position engaging the valve seat.

18. The apparatus of claim 17, wherein the float means includes release means for moving the plug member from its closed position to an opened position away from the valve seat as the float means sinks in the fuel tank in response to falling levels of liquid fuel in the fuel tank so that pressurized fuel vapor is able to escape from the fuel tank through the venting outlet aperture without necessarily passing through the conducting means formed in the plug member.

19. The apparatus of claim 17, wherein the plug member further includes an arm member connected to the blocking means and the float means includes flange means for engaging and moving the arm member during movement of the float means away from the plug member.

20. The apparatus of claim 17, wherein the plug member further includes a nipple, the nipple has a distal tip configured to establish a seal against the valve seat upon mating engagement therewith and a base, the nipple is perforated to provide the conducting means extending therethrough, the conducting means has an inlet opening provided in the base and an outlet opening provided in the distal tip and arranged to discharge fuel vapor from the fuel tank through the venting outlet aperture when the plug member is in its closed position engaging the valve seat.

21. The apparatus of claim 20, wherein the plug member further includes a frame assembly depending from the base of the nipple and the frame assembly is formed to include aperture means for communicating fuel vapor from the fuel tank to the inlet opening of the conducting means.

22. The apparatus of claim 21, wherein the float means includes flange means for engaging the frame assembly to move the plug member from its closed position to an opened position away from the valve seat as the float means sinks in the fuel tank in response to falling levels of liquid fuel in the fuel tank.

23. A fuel tank vent apparatus, comprising
 means for venting fuel vapor from a fuel tank to a discharge passageway outside the fuel tank through a normally open venting outlet aperture, and
 means for selectively blocking discharge of liquid fuel from the fuel tank to the discharge passageway through the venting outlet aperture during agitation of liquid fuel in the fuel tank, the blocking means including a plug member movable between a closed position closing the venting outlet aperture and an opened position opening the venting outlet aperture, the plug member having an outer portion exposed to pressure extant in the discharge passageway and an inner portion exposed to pressure extant in the fuel tank upon movement of the plug member to its closed position, and means for selectively conducting fuel vapor from the fuel tank to the discharge passageway while the plug member occupies its closed position to increase the pressure extant in the discharge passageway and bearing against the outer portion of the plug member so that an opening force is applied to the plug member that is larger than the closing force applied to the plug member by the pressure extant in the fuel tank bearing against the inner portion of the plug member to assist in moving the plug member from its closed position to an opened position.

24. The apparatus of claim 23, wherein the conducting means includes bypass means for passing fuel vapor from the fuel tank to the discharge passageway through the plug member while the plug member occupies its closed position.

25. The apparatus of claim 23, wherein the blocking means further includes means for moving the plug member to its closed position in response to agitation of liquid fuel in the fuel tank and the conducting means further includes means coupled to the blocking means for closing the bypass means in response to movement of the plug member to its closed position.

26. The apparatus of claim 25, wherein the moving means is a float member buoyantly supported on liquid fuel extant in the fuel tank for movement relative to the plug member during rising and falling levels of liquid fuel in the fuel tank and the closing means is positioned to be moved by the float member from a closed position closing the bypass means to an opened position opening the bypass means in response to falling levels of liquid fuel in the fuel tank, thereby allowing pressurized fuel vapor to be vented from the fuel tank to the discharge passageway through the bypass means formed in the plug member even while the plug member remains in its closed position.

27. The apparatus of claim 23, wherein the blocking means further includes float means buoyantly supported on liquid fuel extant in the fuel tank for moving the plug member to is closed position in response to rising levels of liquid fuel in the fuel tank and flange means on the float means for moving the plug member away from its closed position to an opened position as the float means sinks in the fuel tank in response to falling levels of liquid fuel in the fuel tank.

28. The apparatus of claim 27, wherein the conducting means further includes means for passing fuel vapor from the fuel tank to the discharge passageway through the plug member while the plug member occupies its closed position and means coupled to the float means for closing the passing means in response to movement of the plug member to its closed position.

29. The apparatus of claim 28, wherein the closing means is positioned to be moved by the float means from a closed position closing the bypass means to an opened position opening the bypass means in response to falling levels of liquid fuel in the fuel tank, thereby allowing pressurized fuel vapor to be vented from the fuel tank to the discharge passageway through the passing means formed in the plug member even while the plug member remains in its closed position.

30. The apparatus of claim 28, wherein the venting means includes a valve seat formed to include the venting outlet aperture, the plug member further includes a nipple, the nipple has a distal tip and a base, the distal tip is configured to provide said outer portion and establish a seal against the valve seat upon mating engagement therewith, and the base is configured to provide said inner portion.

31. The apparatus of claim 30, wherein the conducting means includes a conduit formed to extend through the plug member between an inlet opening provided in the base and an outlet opening provided in the distal tip and arranged to discharge pressurized fuel vapor from the fuel tank into the discharge passageway through the venting outlet aperture when the plug member is in its closed position engaging the valve seat.

32. The apparatus of claim 30, wherein the plug member includes a frame assembly depending from the base of the nipple and the frame assembly is formed to include aperture means for communicating fuel vapor from the fuel tank to the inlet opening of the conduit.

33. The apparatus of claim 32, wherein the conducting means further includes a float member buoyantly supported on liquid fuel extant in the fuel tank, and the float member provides means for moving the plug member to its closed position in response to rising levels of liquid fuel in the fuel tank and means for engaging and moving the frame assembly to move the plug member from its closed position to an opened position away from the valve seat as the float member sinks in the fuel tank in response to falling levels of liquid fuel in the fuel tank.

* * * * *